United States Patent
Kaup et al.

(10) Patent No.: US 11,920,206 B2
(45) Date of Patent: Mar. 5, 2024

(54) COLD ROLLED FLAT STEEL PRODUCT FOR PACKAGING AND METHOD FOR PRODUCING A STEEL FLAT PRODUCT

(71) Applicant: thyssenkrupp Rasselstein GmbH, Andernach (DE)

(72) Inventors: Burkhard Kaup, Andernach (DE); Peter Kirchesch, Koblenz (DE); Manuel Köhl, Mending (DE); Dimitrios Nouskalis, Burgbrohl (DE); Alexander Gossen, Rengsdorf (DE); Björn Ehmke, Sankt Johann (DE)

(73) Assignee: thyssenkrupp Rasselstein GmbH, Andernach (DE)

( * ) Notice: Subject to any disclaimer, the term of this patent is extended or adjusted under 35 U.S.C. 154(b) by 0 days.

(21) Appl. No.: 17/958,603

(22) Filed: Oct. 3, 2022

(65) Prior Publication Data

US 2023/0107544 A1    Apr. 6, 2023

(30) Foreign Application Priority Data

Oct. 4, 2021    (DE) ..................... 10 2021 125 692.5

(51) Int. Cl.
*C21D 8/02*    (2006.01)
*C21D 9/46*    (2006.01)
(Continued)

(52) U.S. Cl.
CPC ......... *C21D 8/0236* (2013.01); *C21D 8/0226* (2013.01); *C21D 8/0263* (2013.01);
(Continued)

(58) Field of Classification Search
None
See application file for complete search history.

(56) References Cited

U.S. PATENT DOCUMENTS

| 4,698,103 A | 10/1987 | Hoogendoorn |
| 9,650,692 B2 | 5/2017 | Szesni |

(Continued)

FOREIGN PATENT DOCUMENTS

| DE | 10 2011 056 847 A1 | 6/2013 | |
| DE | 102011056846 A1 | * 6/2013 | ........... B21D 51/383 |

OTHER PUBLICATIONS

Search Result of German Patent Application No. 10 2021 125 692.5 filed Oct. 4, 2021.

*Primary Examiner* — Anthony M Liang
(74) *Attorney, Agent, or Firm* — Paul D. Bianco; Katharine Davis Wong; Fleit Intellectual Property Law

(57) ABSTRACT

A cold rolled steel flat product for packaging made of a low carbon steel having a thickness of less than 0.49 mm and a method of making. The steel flat product has a martensite-free microstructure and represents a standard grade for packaging with tensile strengths from 300 to 550 MPa, which can be produced from a cold-rolled steel sheet with a carbon content from 0.01% to 0.1% by weight by inductive annealing of the steel sheet and subsequent water cooling for quenching the recrystallization-annealed steel sheet. To achieve flatness of 5 I-units or less, the induction annealed steel sheet is first primarily cooled in the manufacturing process to a take-off temperature at a rate of less than 1000 K/s, with the take-off temperature being below the transformation temperature of 723° C., and thereafter a secondary cooling by water cooling with a water temperature of less than 80° C. at a rate of more than 1000 K/s.

20 Claims, 5 Drawing Sheets

(51) Int. Cl.
*C21D 9/573* (2006.01)
*C22C 38/00* (2006.01)
*C22C 38/02* (2006.01)
*C22C 38/04* (2006.01)
*C22C 38/06* (2006.01)

(52) U.S. Cl.
CPC ............ *C21D 8/0273* (2013.01); *C21D 9/46* (2013.01); *C21D 9/573* (2013.01); *C22C 38/001* (2013.01); *C22C 38/002* (2013.01); *C22C 38/02* (2013.01); *C22C 38/04* (2013.01); *C22C 38/06* (2013.01); *C21D 2211/005* (2013.01)

(56) References Cited

U.S. PATENT DOCUMENTS

2015/0010779 A1  1/2015  Szesni
2015/0017469 A1  1/2015  Sauer

\* cited by examiner

COLD ROLLED FLAT STEEL PRODUCT FOR PACKAGING AND METHOD FOR PRODUCING A STEEL FLAT PRODUCT

FIELD OF THE INVENTION

The invention relates to a cold-rolled flat steel product for packaging having a thickness of less than 0.49 mm, and to a method of manufacturing such a flat steel product.

In the production of flat steel products such as cold-rolled steel sheets and steel strips for packaging, annealing of the flat steel product at temperatures above the recrystallization temperature takes place after a (primary) cold rolling in order to restore the original structural condition of the steel and the formability. Particularly in the case of flat steel products for the manufacture of packaging, such as beverage cans or food cans, good formability is an important material parameter, as the flat steel products steel are subjected to severe deformations during the manufacture of such packaging in deep-drawing and stretch-forming methods. To withstand these deformations during packaging production, the flat steel products must also have high strength.

For reasons of weight reduction and lower material usage, thinner flat steel products are increasingly being used for the manufacture of packaging. In the case of very thin flat steel products, some of which have a thickness of less than 0.2 mm, a further increase in the strength of the steel used is required to ensure adequate stability of the packaging made from them. Concepts for the production of higher-strength flat steel products with tensile strengths of more than 550 MPa have therefore been developed in the prior art. DE 102011 056 847 A1, for example, discloses a method for the production of steel sheets for use as packaging steel, with which cold-rolled steel sheets with tensile strengths of more than 500 MPa at an elongation at break of more than 5% can be produced. The high tensile strength is achieved by forming a multiphase microstructure with a hard martensite phase. To form the multiphase microstructure, recrystallization annealing of the cold-rolled flat steel product involves first rapid heating by magnetic induction to annealing temperatures above the Ac1 temperature and then rapid cooling with water, so that the austenite phase formed in the steel during induction heating to the annealing temperature is converted into martensite.

The inductive heating of the flat steel product during recrystallization annealing known from DE 10 2011 056 847 A1 is also advantageous from the point of view of reducing climate-damaging waste gases. In conventional heating methods, the flat steel products are heated for annealing in a bell-type annealing furnace or in a continuous annealing furnace by thermal conduction or thermal radiation. In this method, the annealing furnaces are generally operated with fossil fuels, which is why climate-damaging emissions are produced, in particular carbon dioxide and nitrogen oxides. An induction furnace, on the other hand, is supplied with electrical energy and can therefore also be operated in a climate-friendly way using electricity generated from renewable sources.

However, high investment costs are incurred for the provision of an induction furnace. As higher-strength flat steel products with tensile strengths of more than 550 MPa are only a niche product in the packaging steels sector, representing only a small share of the overall market for packaging steel products, it is necessary for economic reasons to be able to produce not only flat steel products with a higher-strength in an annealing facility with an induction furnace and downstream water cooling for quenching the recrystallization-annealed steel sheets, but also those in the range of so-called standard grades with tensile strengths in the 300 to 550 MPa range.

However, for such standard grades with lower strength, problems arise with the flatness of the annealed flat steel products due to the rapid temperature changes between the rapid heating in the induction furnace and the rapid cooling in the water cooling system.

SUMMARY

One aspect of the invention therefore is to provide flat steel products in standard grades having a flatness sufficient for the production of packaging which can be recrystallizing annealed in a fast, cost-effective and energy-efficient method in a climate-friendly manner with reduced generation of climate-damaging emissions.

Accordingly, disclosed herein are a flat steel product and a manufacturing method. Preferred embodiments of the flat steel product and the manufacturing method are also disclosed.

The flat steel product for packaging according to the invention is made of a steel with the following composition in terms of weight:
C: 0.01-0.1%,
Si: <0.03%,
Mn: <0.6%,
P: <0.1%,
S: <0.03%,
Al: <0.1%,
N: <0.07%,
Residual iron and unavoidable impurities,
wherein a slab is cast from a steel melt having said composition and a hot strip is produced from the slab by hot rolling, wherein the hot strip is brought to a thickness of less than 0.49 mm by cold rolling at a reduction ratio of at least 80% to a cold-rolled steel strip, and the cold-rolled steel strip is then subjected to recrystallization annealing in a continuous annealing furnace at an annealing temperature above the recrystallization temperature, wherein the cold-rolled steel strip is inductively heated to the annealing temperature in the continuous annealing furnace and held for a predetermined holding time at the annealing temperature. After the holding time has elapsed, the annealed steel strip is cooled in a primary cooling step at a primary cooling rate of at most 1000 K/s to a take-off temperature (Tq) and immediately thereafter in a secondary cooling step the steel strip is cooled at a secondary cooling rate of more than 1000 K/s to a temperature of less than 80° C. The take-off temperature (Tq) is below the transformation temperature (Ac1) of 723° C. and preferably below the recrystallization temperature and is particularly preferably less than 690° C., in particular less than 600° C. The primary cooling rate preferably is less than 400 K/s and in particular less than 200 K/s. The secondary cooling rate preferably is more than 1500 K/s and in particular more than 2000 K/s.

In the manufacturing method according to the invention, the steel strip is inductively heated for annealing in the continuous annealing furnace to the annealing temperature at a heating rate of preferably more than 100 K/s. Preferably the heating rate is higher than 300 K/s and in particular between 400 K/s and 600 K/s.

Because in the primary cooling, which takes place at a much lower cooling rate than the secondary cooling, the steel strip is cooled to temperatures below the transformation temperature (Ac1) of 723° C., no martensite is formed in the steel. However, since no equilibrium conditions exist in the real steel structure, martensite islands can still be detected below the Ac1 transformation temperature. In order to avoid a martensite phase, the primary cooling is preferably carried out to take-off temperatures below 690° C., particularly preferably to 650° C. or less, and in particular to a take-off temperature in the range from 500° C. to 600° C. In principle, take-off temperatures below 500° C. are possible, but require a higher cooling capacity during primary cooling of the annealed steel strip and are therefore not preferred. The flat steel product produced by the manufacturing method according to the invention is characterized by a martensite-free microstructure if the take-off temperature is below the Ac1 transformation temperature and preferably below 690° C. The steel microstructure of the flat steel product according to the invention consists at least substantially, i.e. preferably to more than 90% and more preferable to more than 95%, only of ferrite. In some cases, in addition to ferrite, constituents of cementite and/or pearlite and/or residual austenite may be present. Preferably, the steel microstructure of the flat steel product of the invention does not contain martensite, bainite or austenite. These preferred microstructures are ensured in the manufacturing method according to the invention in particular by the cooling conditions during cooling of the cold-rolled steel strip after annealing.

In order to minimize the cooling time, the primary cooling rate, at which the steel strip is cooled from the annealing temperature to the take-off temperature (Tq), is preferably at least 25 K/s. In order to be able to carry out the primary cooling with a pure gas cooling, the primary cooling rate preferably is limited to a maximum of 1000 K/s, more preferably to less than 400 K/s and in particular to less than 200 K/s. In order to be able to carry out primary cooling with a nitrogen gas cooling, the primary cooling rate is preferably in the range of 25 K/s and 400 K/s for equipment reasons. The product of the thickness of the steel strip and the primary cooling rate, which is relevant for a suitable apparative selection of the cooling device for primary cooling, is preferably between 5 K s$^{-1}$ mm and 200 K/s$^{-1}$ mm.

Compared to flat steel products with a comparable composition, in particular with a low carbon content in the range of 0.01 to 0.1% by weight (low carbon, LC) and a multi-phase steel structure comprising a hard martensite phase, the flat steel products according to the invention exhibit a lower tensile strength and a lower yield strength. In an aged condition, the flat steel products according to the invention exhibit, for example, a 0.2% yield strength (Rp0.2) of between 300 MPa and 700 MPa. The elongation at break (A) of the flat steel products according to the invention in an aged state is preferably in the range from 10% to 35% and more preferably between 20% and 30%. The aged condition of the flat steel product is obtained either naturally by a storage of the flat steel products and/or by a painting with subsequent drying, or artificially by heating the flat steel product for 20 minutes to temperatures in the range from 200° C. to 210° C. The mechanical parameters of the stress-strain curve of the flat steel products according to the invention thus correspond to the values of standard grades of steel sheets for the production of packaging.

The strength of the flat steel products depends on the mechanical post-treatment after cooling. In the case of single-reduced (SR) steel sheets, which have been skin passed (i.e. cold re-rolled) after cooling to a maximum reduction degree of 5%, the yield strength of the flat steel products according to the invention is in the range of 300 to 500 MPa. In the case of double-reduced (DR) steel sheets, after ageing, the yield strength of the flat steel products according to the invention is in the range of 430 to 700 MPa. The tensile strengths are in each case approx. 25 MPa higher than the values of the yield strengths.

In order to maintain these preferred ranges for the tensile strength or yield strength of the flat steel products according to the invention, the take-off temperature during cooling of the recrystallization-annealed steel strip is preferably kept below 600° C. and, in particular, in the most preferred range of 500° C. to 600° C.

Therefore, with the method according to the invention, packaging sheet products with strengths and elongations at break in the range of standard grades can be produced due to the two-stage cooling after recrystallization annealing with a slower primary cooling and a fast secondary cooling, although high temperature differences are passed through in a short time due to the fast inductive heating and the secondary fast cooling. The method according to the invention therefore enables a cost-effective and environmentally and climate-friendly production of flat steel products for packaging in the range of standard grades, despite a very fast and energy-efficient as well as low-emission thermal treatment comprising a combination of inductive heating and rapid cooling with water (water quenching). The advantages of induction heating can be exploited, in particular the formation of a very short continuous annealing furnace (which is ensuring a very fast and efficient process control and lower investment costs), lower operating and maintenance costs (compared with conventional annealing furnaces operated with fossil fuels using conventional radiant heating tubes), low-emission operation (since the induction furnace can be operated with regeneratively generated electricity and no nitrogen oxides are produced), and rapid start-up and shutdown of the strip annealing system without heating or cooling phases and rapid temperature changes during an annealing process. Finally, an induction furnace has a much better efficiency compared to conventional annealing furnaces with radiant heating tubes, which is why the method according to the invention has a very good energy efficiency.

The total annealing time, during which the cold-rolled steel strip remains in the continuous annealing furnace during annealing, is composed of the heating time for heating the steel strip to the annealing temperature, and the holding time, wherein the heating time is very short due to induction heating. Depending on the heating rate, the heating time is in the range of 1 to 6 seconds. To ensure complete recrystallization of the steel structure, an annealing time of less than 5 seconds, often less than 1 second, is sufficient, depending on the annealing temperature and recrystallization temperature. During the holding time, the steel strip remains at a temperature above the recrystallization temperature. In the method according to the invention, the holding time is preferably set between 0.5 and 2.0 seconds and is more preferably less than 1 second, in particular between 0.60 and 0.95 seconds.

The annealing temperature is preferably between 690° C. and 769° C. The upper limit of 769° C. is defined by the Curie temperature, which cannot be exceeded during induction heating of steel. An annealing temperature of 690° C. is sufficient for complete recrystallization of the steel structure within a preferred annealing time of less than 5 seconds and therefore represents an advantageous lower limit for the annealing temperature. As the annealing temperature increases, the annealing time required for complete recrystallization decreases. An annealing time of less than 1 second requires an annealing temperature of 725° C., so the range of 725° C. to 769° C. is a particularly preferred range for the annealing temperature.

The primary cooling of the steel strip after complete recrystallization in the induction furnace is preferably carried out by gas cooling, in particular by a gas jet. Secondary cooling is preferably carried out by water cooling, in particular by water quenching, wherein the steel strip is immersed in a water bath with a water temperature of less than 95° C., preferably 80° C. or less. For energy reasons, the highest possible water temperature of up to 95° C. is advantageous, since at these temperatures the cooling water can be reused as a heating medium in other processes with an optimized efficiency. However, a water temperature of more than 80° C. should be avoided because otherwise the too much cooling water evaporates when the steel strip is immersed in the water bath, which can extend the cooling time due to the Leidenfrost phenomenon caused by a vapor layer between the steel strip and the cooling water. However, lower water temperatures of 25° C. or less are preferred to optimize strip flatness. A preferred range of water temperature is therefore between 10° C. and 80° C., and more preferably between 15° C. and 50° C.

Furthermore and surprisingly, the flat steel product according to the invention also exhibits very good flatness. The flatness of the flat steel products according to the invention can be quantified by the measuring methods defined in ASTM standard A 1030/A1030M-11 "Standard Practice for Measuring Flatness Characteristics of Steel Sheet Products". Assuming that the unevenness of flat steel products (by which steel sheets and steel strips are understood) essentially conforms to a sinusoidal shape, the flatness of flat steel products can be expressed in "I-units" according to the calculation given in the above standard. Frequently, rolling mills for cold-rolling or skin-passing flat steel products are equipped with measuring devices that record the flatness of the cold-rolled or skin-passed flat steel product (even in the case of differently shaped flatness defects) directly in I-units. The flat steel products according to the invention have a flatness of 5 I-units or less.

The good flatness of the flat steel products according to the invention can also be attributed to the two-stage cooling after recrystallization annealing. Due to the primary cooling with a primary cooling rate of preferably less than 400 K/s, which is considerably lower than the secondary cooling rate, the recrystallization-annealed steel strip is precooled before it is finally cooled in the secondary cooling with the very high secondary cooling rate of preferably more than 1000 K/s down to temperatures below 80° C. This results in lower stresses in the steel structure, particularly in the time phase immediately after leaving the continuous annealing furnace and during primary cooling. Because of the lower stresses, there is less formation of unevenness. Since during primary cooling the steel strip is cooled to temperatures below the recrystallization temperature and in particular to temperatures of less than 600° C., the steel structure has already formed after primary cooling. For this reason, no appreciable stresses and therefore hardly any unevenness are produced in the steel strip during subsequent secondary cooling at the very high secondary cooling rate.

The flatness of the flat steel product according to the invention can also be characterized by an edge corrugation with a maximum corrugation height (h) of 1.5 mm, which preferably is less than 1.0 mm. Another characteristic of good flatness can be attributed to the number of corrugations along a given length of the steel strip, which in the flat steel product according to the invention preferably is less than six corrugations with a corrugation height (h) of more than 1.0 mm per meter length of the steel strip in the rolling direction.

An important method parameter of the method according to the invention, which influences the flatness of the flat steel products, is the take-off temperature (Tq) at which secondary cooling (water quenching) is initiated. This take-off temperature (Tq) is determined by the annealing temperature from which the steel strip is cooled during primary cooling, as well as the primary cooling rate and the cooling duration of the primary cooling. Below a critical take-off temperature (Tq) of about 715° C., the flat steel products according to the invention exhibit good flatness in the range of 5 I-units or less. Above this critical take-off temperature, a linear increase in flatness defects, expressed by I-units, is observed at the strip edges. Therefore, the take-off temperature is preferably below 715° C. Furthermore, the formation of a multiphase microstructure containing martensite and/or retained austenite in a ferritic matrix can be observed at take-off temperatures being higher than 700° C. Since such a multiphase structure is to be excluded in the flat steel product according to the invention and because the flat steel products with a multiphase structure exhibit a high tempering sensitivity with a reduction in tensile strength after ageing of up to 50 MPa, the take-off temperature is preferably less than 690° C. and in particular it is between 500° C. and 650° C. and is most preferable between 550° C. and 600°.

When using water cooling, in particular quenching the steel strip in a water tank, problems with corrosion resistance can arise on the surface of the steel strip due to an (iron) oxide layer. To avoid corrosion problems, a maximum oxide coverage of the surface of the flat steel product of 300 C/m$^2$, preferably of less than 100 C/m$^2$, are desired. To achieve this, the method according to the invention preferably involves conditioning the quenching water used for water quenching during secondary cooling. In particular, the content of oxygen dissolved in the quenching water is reduced for this purpose. Particularly, to achieve this, the quenching water can be depressurized, for example by injecting inert gas (such as N$_2$ and/or HNx).

Furthermore, the oxygen content in the furnace atmosphere of the continuous annealing furnace can also be minimized and the water temperature of the quenching water can be reduced to 20° C. or less in order to minimize the oxide coating on the surface of the steel strip. If the quench water has been conditioned by reducing the dissolved oxygen content, a low quench water temperature of 20° C. or less can be set. Conditioning the quench water, for example with inert gas (N$_2$, HNx), allows the concentration of dissolved oxygen in the quench medium to be selectively adjusted, almost independently of the temperature. This means that a predetermined, constant concentration of dissolved oxygen can be set even at different water temperatures. Indeed, an increased water temperature leads to a thicker and thus more stable and longer vapor film between the strip surface and the cooling water. A more stable and thus longer vapor film increases the reaction time of the three-phase reaction (water, vapor, steel) and thus also increases the oxide load measurable on the strip surface, because oxidation of the strip surface takes place in the area of stable film evaporation, where a stable vapor film is present in which a three-phase reaction takes place. The oxygen dissolved in the cooling water passes into the vapor film due to the (local) temperature increase caused by the steel strip during secondary cooling and is then available there for oxidation of the strip surface and increases the oxide load. For this reason, lower water temperatures of 20°

C. or less, in particular in the range from 15° C. to 20° C., are preferred for the cooling water in order to avoid a high oxide load during secondary cooling. As a result, oxide occupancies on the surface of the steel strip of less than 300 C/m² can be achieved.

In the method according to the invention, the recrystallizing annealed steel strip can be skin passed after cooling at a skin pass degree of 0.2% to 5%, or secondarily cold rolled (re-rolled) at a re-rolling rate of more than 5% to 45%. The yield strength for skin pass rolling (single reduced, SR) is in the range of 300 MPa to 500 MPa and for secondary re-rolling (double reduced, DR) it is in the range of 430 MPa to 700 MPa. During skin passing or re-rolling, flatness is further improved, in particular across the width of the steel strip.

After secondary cold rolling (re-rolling) or skin pass rolling, the flat steel product according to the invention can be coated with anti-corrosion layers, e.g. with a tin layer applied by electrolytic tin plating (for the production of tinplate) and/or a chromium/chromium oxide coating applied by electrolytic chromium plating (for the production of electrolytic chromium coated steel: ECCS). In addition or alternatively, chromium-free passivation layers and organic coatings such as polymer layers, in particular in the form of a polymer coating or polymer films, can also be applied to the surface.

BRIEF DESCRIPTION OF THE DRAWINGS

These and other features as well as advantages of the flat steel products according to the invention and of the method for their production are disclosed in the embodiments and examples described below with reference to the drawings.

The drawings show:

FIG. 2a shows the influence of the take-off temperature (Tq) on the strength (Rp2, ReL, ReH and Rm) and FIG. 2b shows the influence of the take-off temperature (Tq) on the elongation at break A;

FIG. 3a shows the influence of the degree of re-rolling (NWG) on the tensile strength (Rm) and FIG. 3b shows the influence of the degree of re-rolling (NWG) on the upper yield strength (ReH);

DETAILED DESCRIPTION

Figure 1:
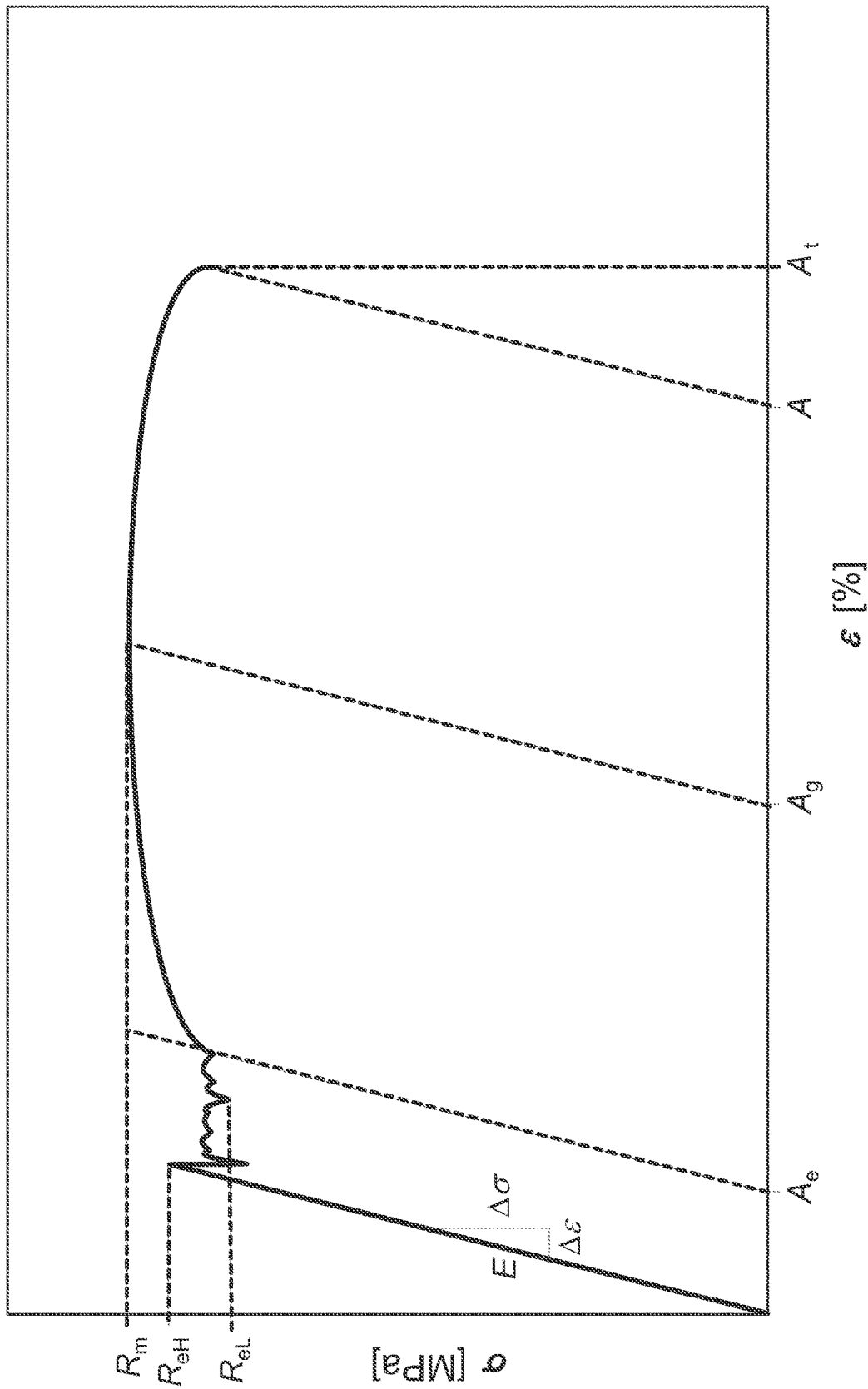
FIG. 1: Typical curve of a stress-strain diagram obtained in a tensile test on an aged flat steel product according to the invention, where ε is the strain and σ is the stress, and ReL represents the lower yield strength, ReH the upper yield strength and Rm the tensile strength.

For the production of flat steel products according to the invention, a slab is cast from a steel melt with a low carbon content (low carbon steel, LC) and is hot-rolled to obtain a hot strip. The components of the steel from which flat steel products according to the invention can be made are explained in detail below:

Composition of the Steel:

Carbon, C: Not Less than 0.01% and not More than 0.1%, Preferably Less than 0.085%;

Carbon increases hardness and strength. Since the aim of the invention is to produce a cold-rolled flat steel product for packaging with a medium strength, e.g. with a yield strength (ReL) in the range from 300 MPa to 700 MPa, the steel contains at least 0.01 wt. % carbon in order to achieve the desired strength even at low re-rolling or skin-passing grades of less than 5%. In order to ensure the rollability of the flat steel product during primary cold rolling and, if necessary, in a second cold rolling step (re-rolling or skin-passing) without reducing the elongation at break, the carbon content should not be too high. Furthermore, as the carbon content increases, a pronounced anisotropy in the form of latency occurs during the production and processing of the flat steel product, since the carbon is present mainly in the form of cementite due to its low solubility in the ferrite lattice of the steel. In addition, as the carbon content increases, the surface quality deteriorates and the risk of slab cracking increases as the peritectic point is approached. This can lead to flatness defects during thermal treatment of the cold-rolled steel flat product. Therefore, limiting the carbon content to a maximum of 0.1% by weight is preferred to avoid the formation of slab cracks and resulting flatness defects. To achieve good flatness and isotropic material properties of the cold-rolled steel sheet, a carbon content of less than 0.085% by weight is particularly preferred.

Manganese, Mn: Not More than 0.6%, Preferably More than 0.17%;

Manganese also increases hardness and strength. In addition, manganese improves the weldability and wear resistance of steel. Furthermore, the addition of manganese reduces the tendency to red fracture during hot rolling by binding sulfur to less harmful MnS. Furthermore, manganese leads to grain refinement and manganese can increase the solubility of nitrogen in the iron lattice and prevent diffusion of carbon to the surface of the slab. Therefore, a manganese content of at least 0.17 wt. % is preferable. To achieve the desired strengths, a manganese content of more than 0.2 wt. %, in particular 0.30 wt. % or more, is preferred. However, if the manganese content becomes too high, this is at the expense of the corrosion resistance of the steel and food compatibility is no longer guaranteed. In addition, if the manganese content becomes too high, also the strength of the hot strip becomes too high, which means that the hot strip can no longer be cold rolled. Therefore, the upper limit for the manganese content is 0.6% by weight.

Phosphorus, P: Less than 0.1%.

Phosphorus is an undesirable by-product in steels. A high phosphorus content leads in particular to embrittlement of the steel and therefore deteriorates the formability of steel flat products, which is why the upper limit for the phosphorus content is 0.1% by weight.

Sulfur, S: Less than 0.03%, Preferably More than 0.001%.

Sulfur is an undesirable concomitant element in steels that deteriorates ductility and corrosion resistance. Therefore, no more than 0.03% by weight of sulfur should be present in the steel. On the other hand, complex and cost-intensive measures have to be taken to desulfurize steel, which is why a sulfur content of less than 0.001 wt. % is no longer justifiable from an economic point of view. The sulfur content is therefore in the range from 0.001 wt. % to 0.03 wt. %, particularly preferably between 0.005 wt. % and 0.01 wt. %.

Aluminum, Al: Less than 0.1%, Preferably More than 0.002%.

Aluminum is required in steel production as a deoxidizing agent for steel quenching. Aluminum also increases scale resistance and formability. For this reason, the aluminum content is preferably more than 0.002% by weight. However, aluminum forms aluminum nitrides with nitrogen, which are disadvantageous because they reduce the amount of free nitrogen and thus reduce the strength achievable by solid solution strengthening with nitrogen. In addition, too high aluminum concentrations can lead to surface defects in the form of aluminum clusters, which also can lead to flatness defects. Therefore, aluminum is used in a concentration of less than 0.1 wt. %.

Silicon, Si: Less than 0.03%;
Silicon increases scale resistance in steel and is a solid solution hardener. In steel production, silicon serves as a deoxidizing agent. Another positive effect of silicon on steel is that it increases tensile strength and yield strength. Therefore, a silicon content of 0.003 wt % or more is preferable to achieve the desired strengths. However, if the silicon content becomes too high, and in particular exceeds 0.03 wt. %, the corrosion resistance of the steel may deteriorate and surface treatments, especially by electrolytic coatings, may become more difficult.

Nitrogen, N: Less than 0.07% and Preferably More than 0.001%.
In steel alloys, nitrogen acts as a solid solution strengthener to increase hardness and strength and has a positive effect on formability, which is reflected, for example, in high values of Erichsen deepening (Erichsen index). Therefore, a nitrogen content of more than 0.001 wt. % is preferable to achieve the desired strength and formability. However, too high nitrogen contents in the molten steel lead to a deterioration of the cold-rollability of the hot strip produced from the molten steel. This is particularly noticeable with a nitrogen content of more than 0.016% by weight. Furthermore, a high nitrogen content in the molten steel increases the risk of defects in the hot-rolled strip, as hot working properties are reduced at very high nitrogen concentrations. Defects in the hot-rolled strip are detrimental to the flatness of the cold-rolled steel sheet. For this reason, the upper limit of the nitrogen content to achieve good flatness is 0.07 wt. % and preferably no more than 0.016 wt. %.

Optional: Nitride Formers, Especially Niobium, Titanium, Boron, Molybdenum, Chromium:
Nitride-forming elements such as aluminum, titanium, niobium, boron, molybdenum and chromium are disadvantageous in the steel of the flat steel products according to the invention because they reduce the proportion of free nitrogen through nitride formation. In addition, these elements are expensive and therefore increase the manufacturing costs. On the other hand, the elements niobium, titanium and boron, for example, have a strength-increasing effect via grain refinement as microalloying constituents without reducing toughness. Therefore, the aforementioned nitride formers can advantageously be added within certain limits as alloying constituents of the steel melt. The steel can therefore (optionally) contain the following alloying constituents by weight:

Titanium, Ti: less than 0.01%;
Boron, B: less than 0.005%,
Niobium, Nb: less than 0.01%,
Chromium, Cr: preferably more than 0.01% to allow the use of scrap in the production of molten steel and to impede the diffusion of carbon on the surface of the slab, but not more than 0.1% to avoid carbides and nitrides,
Molybdenum, Mo: less than 0.02% to avoid excessive increase in recrystallization temperature;

Other Optional Components:
In addition to the residual iron (Fe) and unavoidable impurities, the molten steel may also contain other optional constituents, such as
optionally copper, Cu: expediently more than 0.002% to allow the use of scrap in the production of the molten steel, but less than 0.1% to ensure food compatibility;
optionally nickel, Ni: expediently more than 0.01% to allow the use of scrap in the production of molten steel and to improve toughness, but less than 0.1% to ensure food compatibility;
optional Tin, Sn: preferably less than 0.03%;

Manufacturing Method of the Flat Steel Product:
With the steel composition described above, a steel melt is produced for the production of flat steel products according to the invention, which is first continuously cast and, after cooling, cut into slabs. The slabs are then reheated to preheating temperatures of more than 1100° C., in particular 1200° C., and hot-rolled to produce a hot-rolled strip with a thickness in the range from 1 to 4 mm.

The final rolling temperature during hot-rolling is preferably above the Ar3 temperature in order to remain austenitic, and is in particular between 800° C. and 920° C.

The hot-rolled strip is coiled into a coil at a predetermined and suitably constant coiling temperature (reel temperature, HT). The coiling temperature is preferably below Ar1 in order to remain in the ferritic range, preferably in the range from 500° C. to 750° C., and particularly preferably is less than 640° C. in order to achieve a homogeneous distribution of carbides and a cementite precipitation as fine as possible.

For the production of a packaging steel in the form of a thin flat steel product in the thickness range of 0.49 mm or less (ultrafine sheets), the hot-rolled strip is cold-rolled, expediently with a thickness reduction (degree of reduction or cold rolling degree) of at least 80% and preferably in the range from 85% to 98%. The width of the steel strip is preferably 1200 mm or less and is particularly preferably in the range from 700 mm to 1100 mm. To restore the crystal structure of the steel destroyed during cold rolling, the cold-rolled steel strip is then recrystallizing annealed in an annealing furnace at an annealing temperature above the recrystallization temperature. This is done, for example, by passing the flat steel product in the form of a cold-rolled steel strip through a continuous annealing furnace in which the steel strip is inductively heated to the annealing temperature and held at the annealing temperature for a predetermined holding time. The heating rate at which the cold-rolled steel strip is inductively heated to the annealing temperature during annealing in the continuous annealing furnace is more than 100 K/s and preferably more than 300 K/s, in particular between 400 K/s to 600 K/s.

The annealing temperature is preferably between 725° C. and 769° C. and the holding time is preferably less than 1 second, in particular between 0.3 and 0.9 seconds, more preferably less than 0.7 seconds and in particular between 0.50 and 0.60 seconds.

After the holding time has elapsed, the recrystallization-annealed steel strip is cooled in a primary cooling step at a primary cooling rate of less than 1000 K/s to a take-off temperature (Tq) which is below the recrystallization temperature and is preferably less than 715° C., in particular less than 600° C. Preferably, the primary cooling rate is less than 400 K/s and, for example, in the range from 100 K/s to 400 K/s. Immediately after primary cooling, a secondary cooling of the steel strip to a temperature of less than 80° C. takes place at a secondary cooling rate of more than 1000 K/s. Preferably the secondary cooling rate is more than 1500 K/s and, for example, is in the range from 1600 K/s to 3000 K/s. The primary cooling preferably is carried out by gas cooling, in particular a gas jet, and the secondary cooling is preferably performed by water cooling, in particular by immersing the steel strip in a water bath with a water temperature of 80° C. or less.

Figure 4:
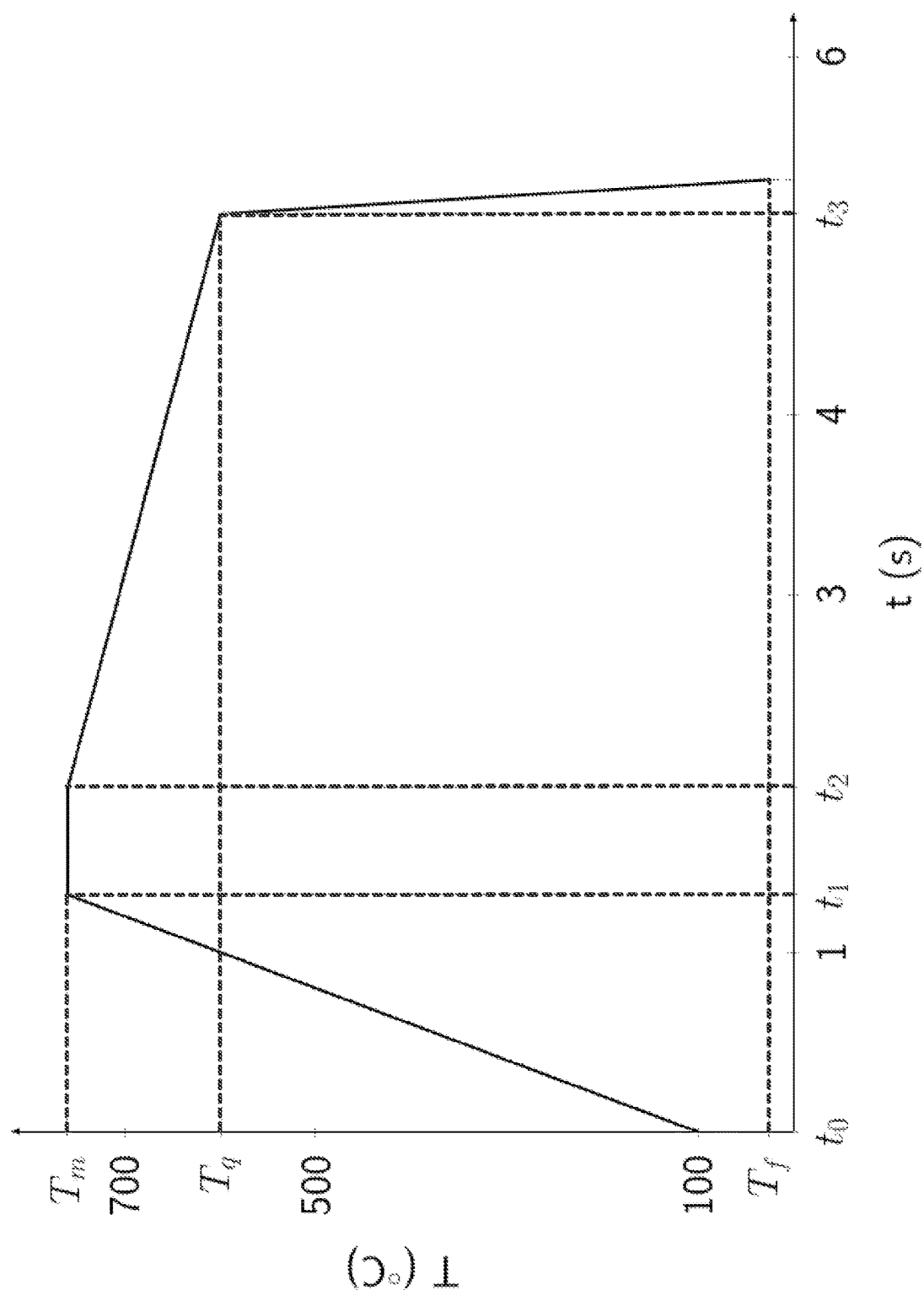
FIG. 4: Graphical representation of a typical annealing cycle performed in the method according to the invention as a temperature-time diagram.

A typical annealing cycle for annealing and cooling the steel strip is shown in FIG. 4. Therein, $T_m$ is designating the (maximum) annealing temperature to which the steel strip is heated in the annealing furnace, $T_q$ is the take-off temperature at which secondary cooling is initiated, and $T_f$ is designating the water temperature of the water cooling system at which secondary cooling takes place. The steel strip is inductively heated to the annealing temperature within a short heating time $t_1$, which is preferably less than 2 seconds and lies, for example, between 1.0 and 2.0 seconds. The steel strip is held at the annealing temperature for a holding time $t_H=t_2-t_1$ until $t_2$ and then cooled. Cooling is carried out in two steps, namely a primary cooling step with gas cooling (up to time $t_3$), in which the steel strip is cooled at a low cooling rate to the take-off temperature $T_q$, and a secondary cooling step beginning at time $t_3$, in which the steel strip is cooled with water at a very high cooling rate to the water temperature $T_f$.

Examples of embodiments of the invention and comparative examples are explained below.

Examples of Embodiments of the Invention

Flat steel products (steel sheets) were produced from steel melts with the alloy compositions listed in Table 1 by hot rolling followed by (primary) cold rolling.

The cold-rolled flat steel products were then subjected to recrystallization annealing in a continuous annealing furnace by inductively heating the flat steel products at a high heating rate to an annealing temperature above the recrystallization temperature and holding them at the annealing temperature for a holding time. At the end of the holding time, the steel strips were cooled in two stages, with a primary cooling by means of gas cooling at a low cooling rate to a take-off temperature $T_q$ followed by a secondary cooling with rapid quenching in a water bath at a predetermined water temperature $T_f$. After cooling, the steel strips were cold re-rolled with a re-rolling degree of 5% to 45% or skin passed with a skin pass degree of 0.2% to a maximum of 5%. The process parameters during annealing and cooling and the subsequent secondary cold rolling or skin-passing are listed in Table 2, and the material parameters obtained are shown in Table 3. Therein Tm is the annealing temperature (in ° C.),
$t_H$ is the dwell time (in s),
dT/dt_K1 is the cooling rate during primary cooling (in K/s),
Tq is the take-off temperature (in ° C.) at the end of primary cooling,
Tf is the water temperature (in ° C.) during secondary cooling,
D is the thickness of the steel strip after re-rolling or skin passing (in mm),
NWG is the degree of re-rolling during secondary cold rolling (in %) or the degree of skin-passing (in %) during skin-passing,
Rp0.2 or Rp2 is the 0.2% Yield strength (in MPa) (in rolling direction),
Rp0.5 or Rp5 is the 0.5% Yield strength (in MPa) (in rolling direction),
ReL is the lower yield strength (in MPa) (in rolling direction),
ReH is the upper yield strength (in MPa) (in rolling direction),
A is the elongation at break (in %) (in the rolling direction),
Rm is the tensile strength (in MPa) (in rolling direction) and
P is the flatness (in U-units) measured according to the standard defined in "ASTM A 1030/A1030M-11".

Comparative Examples

For comparison purposes, the steel sheets with the alloy composition according to Table 1 were subjected to recrystallization annealing in a continuous annealing furnace by inductively heating the flat steel products at a heating rate of more than 100 K/s to an annealing temperature above the recrystallization temperature and holding them at the annealing temperature for a holding time and then cooling them in a single step by means of water cooling at a cooling rate of more than 1000 K/s. The flat steel products of the comparative examples were then subjected to a single step cooling process at a cooling rate of more than 1000 K/s. After cooling, the steel strips were cold re-rolled with a re-rolling degree of 5% to 45% or skin-passed with a skin-passing degree of 0.2% to a maximum of 5%. The process parameters for annealing and cooling and the subsequent secondary cold rolling or skin-passing of these comparative examples are given in Table 2, and the material parameters obtained are shown in Table 3.

The specimens of the examples according to the invention and the comparative examples were subjected to artificial aging after skin-passing or secondary re-rolling by keeping the specimens at an aging temperature of approx. 200° C. to 210° C. for more than 20 minutes. Tensile tests were carried out on the aged specimens to determine the mechanical properties (according to DIN EN 102020 and EN ISO 6892). A typical stress-strain diagram of an aged specimen is shown in FIG. 1.

For skin-passed specimens with a degree of re-rolling <5%, $R_{eL}$ is specified as the yield strength in the aged condition. For re-rolled specimens with a degree of re-rolling ≥5%, Rex or the 0.5% proof stress ($R_{p0.5}$) is specified as the yield strength in the aged condition, since $R_{eL}$ cannot always be determined for these specimens. In general, the following applies to the determination of the yield strength: if ReL can be determined, this parameter should generally be used; if this is not the case, the use of the Rp0.2% yield strength is recommended as a suitable parameter as long as a plateau in the Lüders strain range is evident; in all other cases, the maximum, ReH and/or Rm should be used.

As can be seen in Table 3, a multiphase microstructure with a martensite phase has formed in the comparative examples (Examples 1, 6 to 10, 15 to 17 and 20 to 22), which is why these examples cannot be qualified as being in the scope of the invention. This can be explained by the high take-off temperature and the rapid cooling during secondary cooling. For the process control during cooling of the recrystallization-annealed steel strip, therefore, take-off temperatures $T_q$ below 690° C. are preferred to avoid a martensite phase. Due to the multiphase microstructure, these examples have a higher yield strength and tensile strength compared with the examples according to the invention, which lie outside the preferred ranges of maximum 500 MPa for the yield strength (for single cold-rolled steel strips with a skin pass degree of less than 5%). Furthermore, examples 6 to 10, 12, 15 to 17 as well as examples 20 to 22 exhibit flatness defects, which is represented by high flatness values of more than 5 I-units, which is why these examples do not qualify as being in the scope of the invention. In example 12, no martensite phase has formed. However, due to a higher water temperature during secondary cooling, as compared to Examples 2 to 5 and Example 11 according to the invention (which are of the same steel No. 6), this sample exhibits flatness defects reflected by flatness values of 17.3 I-units, which are outside the range of the invention.

Figure 2A:
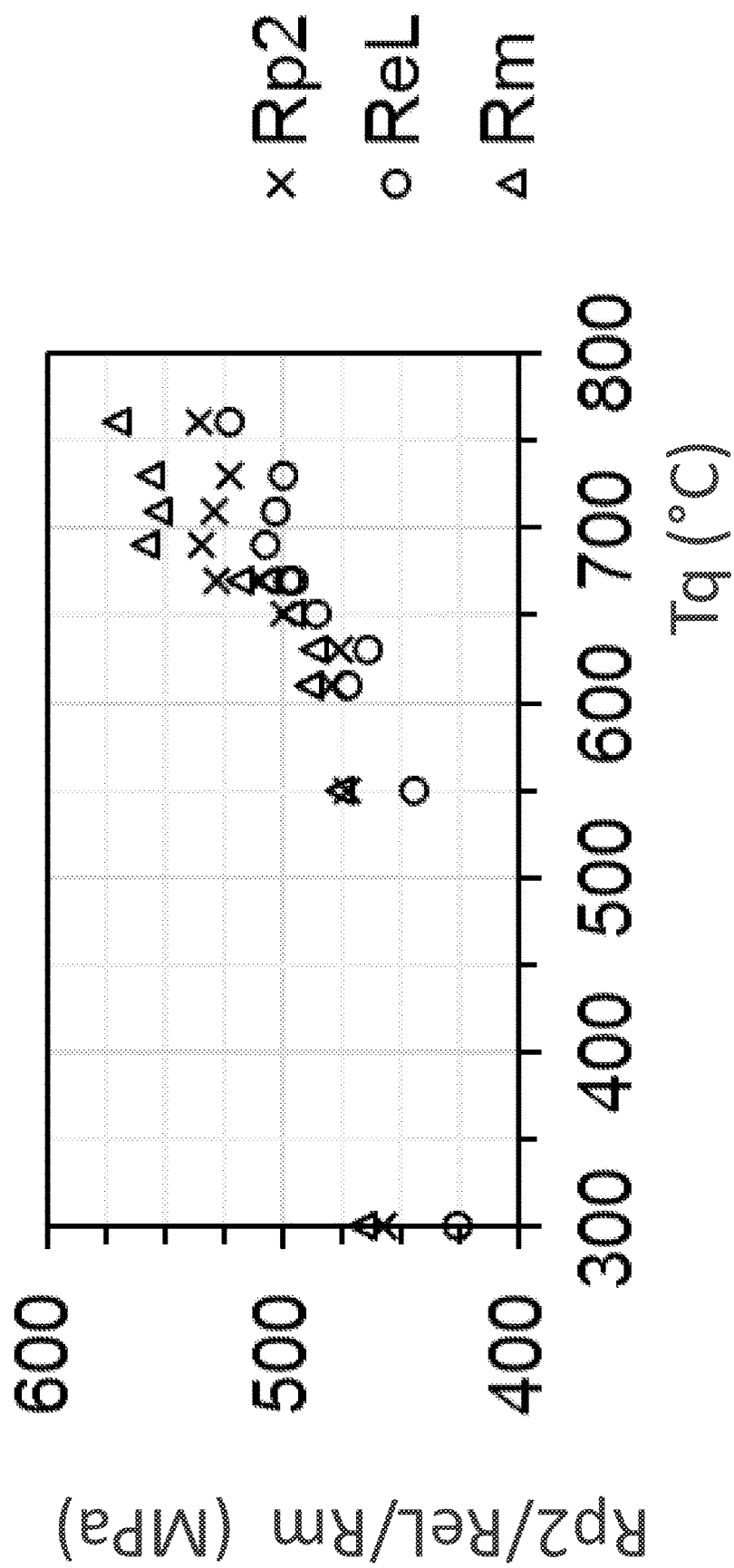
FIGS. 2a and 2b: Graphical representation of the strength and elongation at break of flat steel products as a function of the take-off temperature (Tq) of the method according to the invention, where
Figure 2B:
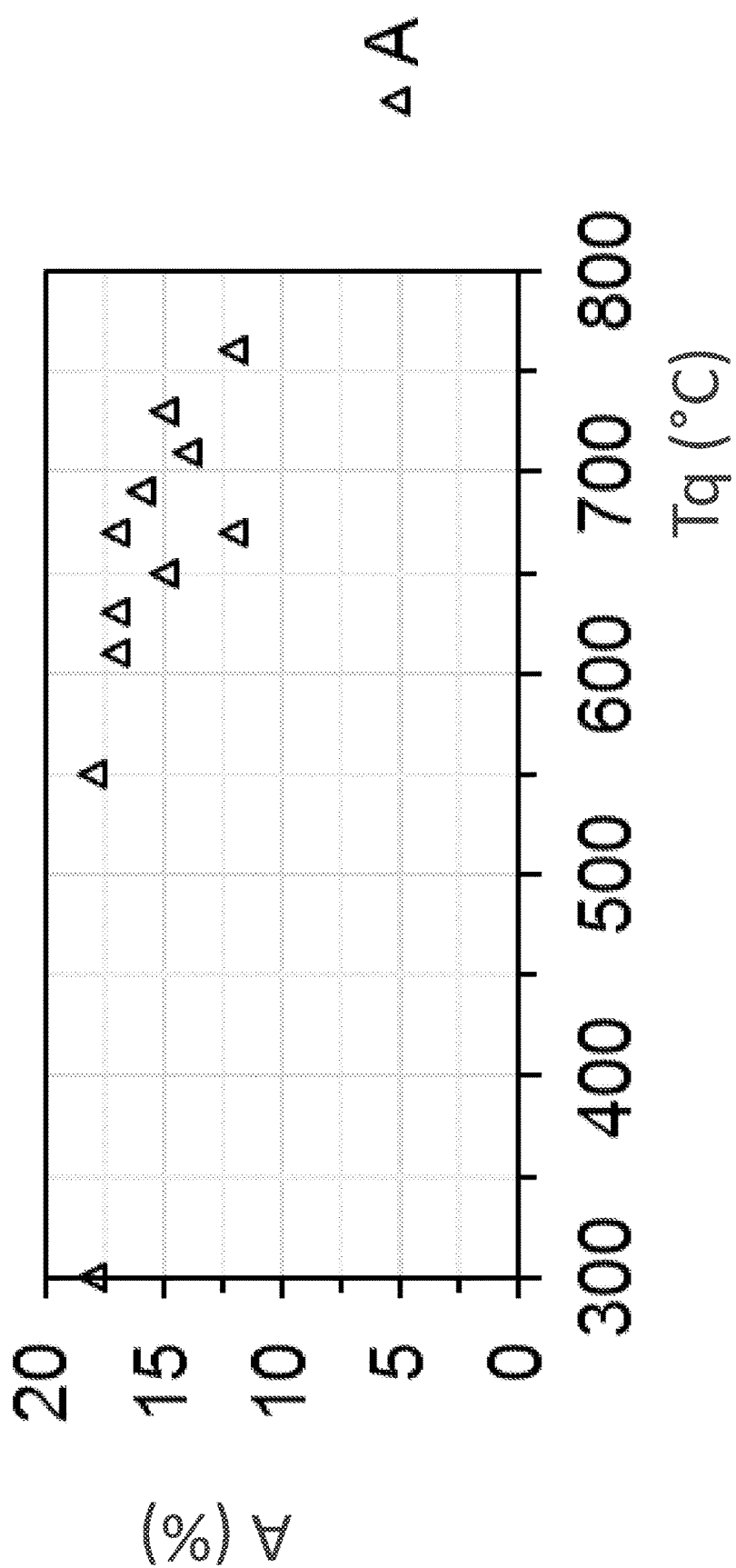

In order to determine the influence of the take-off temperature $T_q$ on the strength and elongation at break, tensile tests with different take-off temperatures $T_q$ were carried out on aged specimens according to Table 1. The results of these tests are shown graphically in FIGS. 2a and 2b, wherein FIG. 2a shows the influence of the take-off temperature $T_q$ on the Yield Strength (Rp2, ReL, ReH and Rm) and FIG. 2b shows the influence of the take-off temperature $T_q$ on the elongation at fracture A. From FIG. 2a, an increase in strength can be observed at take-off temperatures Tq above approx. 650° C., whereas the take-off temperature $T_q$ has only little influence on the elongation at break, as can be seen from FIG. 2b.

Figure 3B:
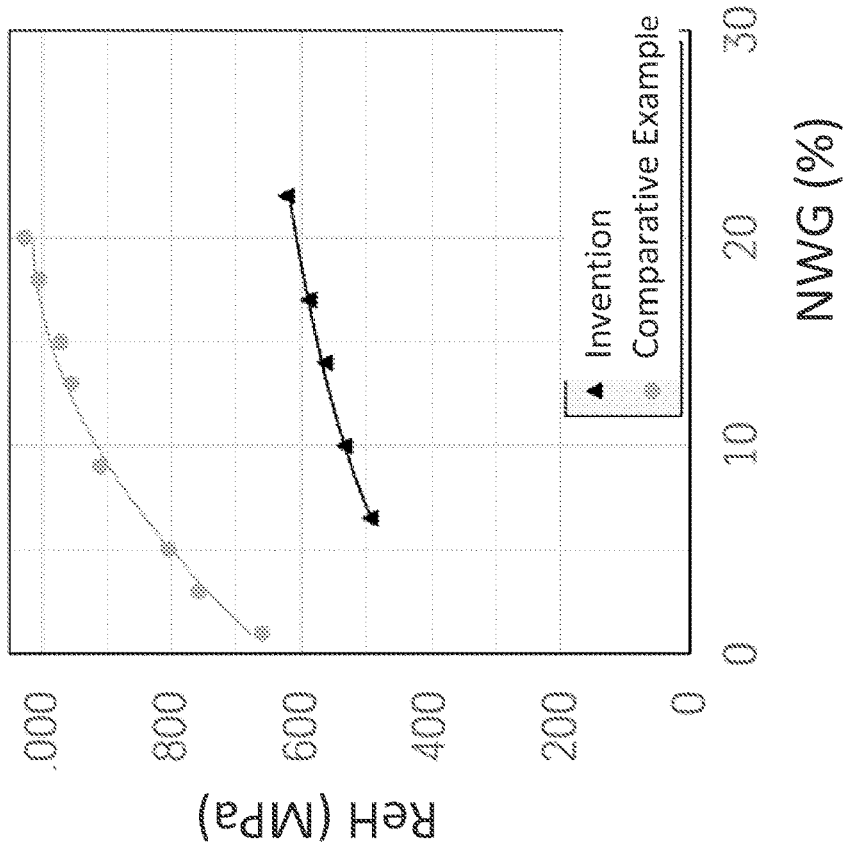
FIGS. 3A and 3B: Graphical representation of the tensile strength and yield strength of flat steel products as a function of the degree of re-rolling during secondary cold rolling and skin pass rolling (skin passing), respectively, where
Figure 3A:
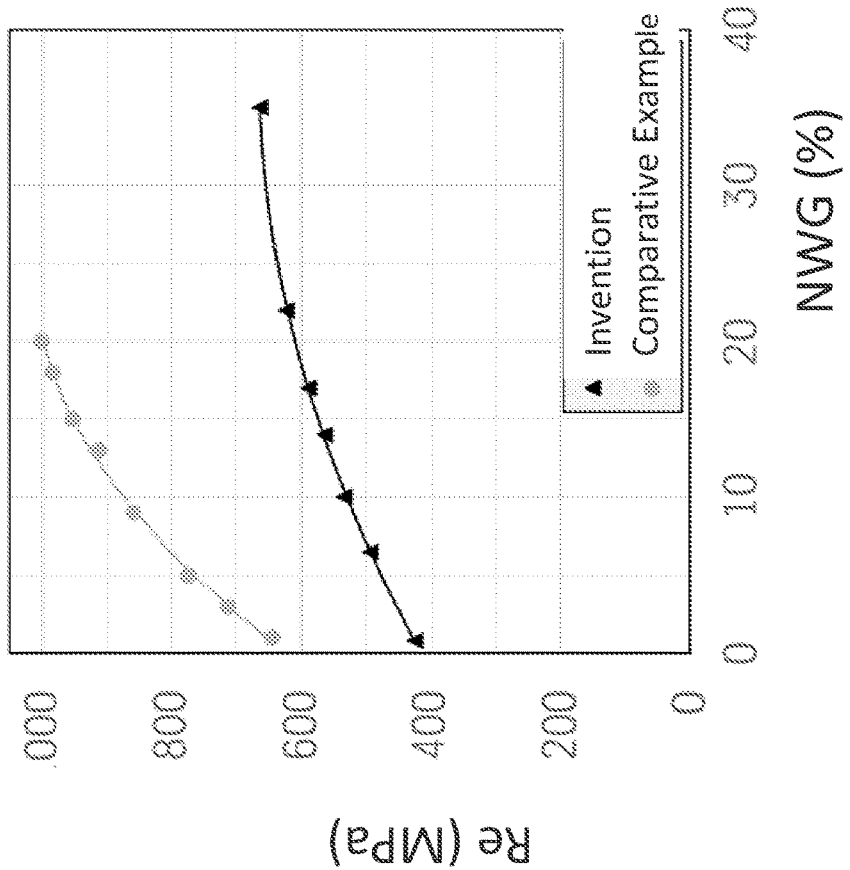

In order to determine the change in strength during re-rolling (secondary cold rolling or skin-passing), tests were carried out on specimens according to the invention and on specimens of the comparative examples with different re-rolling degrees (NWG). The results of these tests are shown graphically in FIGS. 3a and 3b, where FIG. 3a shows the influence of the degree of re-rolling (NWG) on the tensile strength (Rm) and FIG. 3b shows the influence of the degree of re-rolling (NWG) on the upper yield strength (ReH). It can be seen from FIGS. 3a and 3b that the degree of rerolling causes a smaller increase in strength in the samples according to the invention than in the comparative examples. The flat steel products according to the invention can therefore be kept within the moderate strength range with yield strengths between 430 MPa and 700 MPa, even in the case of double reduced (DR) specimens with re-rolling degrees of 5% to 45%. This allows the formation of flat steel products with moderate strength and lower thicknesses of 0.21 mm or less, by double cold rolling. At skin pass degrees of 5% or less, the flat steel products of the invention have yield strengths in the range of 300 MPa to 500 MPa.

In the tables, the European convention of using a comma to separate the integral part of a number from the decimal part is used.

TABLE 1

| | | | | | | | Mass % | | | | | | | | |
|---|---|---|---|---|---|---|---|---|---|---|---|---|---|---|---|
| Steel | C | Mn | P | Si | Al | Cu | Cr | Nb | Ti | S | Sn | B | Mo | Ni | N |
| 1 | 0.021 | 0.21 | 0.010 | 0.005 | 0.022 | 0.014 | 0.021 | <0.0010 | <0.0010 | 0.010 | 0.002 | 0.002 | 0.004 | 0.020 | 0.0025 |
| 2 | 0.025 | 0.25 | 0.012 | 0.020 | 0.031 | 0.017 | 0.030 | <0.0010 | <0.0010 | 0.004 | 0.003 | — | 0.003 | 0.015 | 0.0054 |
| 3 | 0.037 | 0.23 | 0.011 | 0.020 | 0.032 | 0.008 | 0.022 | <0.0010 | <0.0010 | 0.005 | 0.002 | — | 0.001 | 0.016 | 0.0043 |
| 4 | 0.058 | 0.29 | 0.009 | 0.010 | 0.031 | 0.011 | 0.046 | <0.0010 | <0.0010 | 0.003 | 0.004 | — | 0.004 | 0.020 | 0.0059 |
| 5 | 0.069 | 0.26 | 0.011 | 0.016 | 0.061 | 0.010 | 0.054 | <0.0010 | <0.0010 | 0.009 | 0.006 | — | 0.002 | 0.020 | 0.0040 |
| 6 | 0.067 | 0.29 | 0.010 | 0.005 | 0.016 | 0.009 | 0.020 | <0.0010 | <0.0010 | 0.010 | 0.002 | — | 0.001 | 0.018 | 0.0111 |

TABLE 2

| Example | Steel [Tab. 1] | D [mm] | NWG [%] | Tm [° C.] | tH [s] | dT/dt_K1 [K/s] | Tq [° C.] | Tf [° C.] |
|---|---|---|---|---|---|---|---|---|
| 1 Comparative Example | 6 | 0.205 | 1.0 | 769 | 1.4 | 50 | 695 | 25 |
| 2 Invention | 6 | 0.205 | 8.0 | 769 | 1.4 | 50 | 685 | 25 |
| 3 Invention | 6 | 0.205 | 1.0 | 769 | 1.4 | 50 | 650 | 25 |
| 4 Invention | 6 | 0.205 | 1.0 | 769 | 1.4 | 50 | 600 | 25 |
| 5 Invention | 6 | 0.205 | 1.0 | 769 | 1.4 | 50 | 550 | 25 |
| 6 Comparative Example | 6 | 0.205 | 1.0 | 769 | 1.4 | 50 | 735 | 25 |
| 7 Comparative Example | 6 | 0.205 | 1.0 | 769 | 1.4 | 50 | 745 | 25 |
| 8 Comparative Example | 6 | 0.205 | 1.0 | 769 | 1.4 | 50 | 735 | 17 |
| 9 Comparative Example | 6 | 0.205 | 1.0 | 769 | 1.4 | 50 | 735 | 35 |
| 10 Comparative Example | 6 | 0.205 | 1.0 | 769 | 1.4 | 50 | 735 | 55 |
| 11 Invention | 6 | 0.205 | 8.0 | 769 | 1.4 | 50 | 685 | 17 |
| 12 Comparative Example | 6 | 0.205 | 8.0 | 769 | 1.4 | 50 | 685 | 35 |
| 13 Invention | 3 | 0.185 | 1.0 | 769 | 1.4 | 50 | 650 | 25 |
| 14 Invention | 3 | 0.185 | 1.0 | 769 | 1.4 | 50 | 650 | 25 |
| 15 Comparative Example | 3 | 0.185 | 1.0 | 769 | 1.4 | 50 | 735 | 25 |
| 16 Comparative Example | 3 | 0.185 | 1.0 | 769 | 1.4 | 50 | 735 | 17 |
| 17 Comparative Example | 3 | 0.185 | 1.0 | 769 | 1.4 | 50 | 735 | 55 |
| 18 Invention | 1 | 0.185 | 1.0 | 769 | 1.4 | 50 | 650 | 25 |
| 19 Invention | 1 | 0.210 | 1.0 | 769 | 1.4 | 50 | 600 | 25 |
| 20 Comparative Example | 1 | 0.210 | 1.0 | 769 | 1.4 | 50 | 735 | 25 |
| 21 Comparative Example | 1 | 0.210 | 1.0 | 769 | 1.4 | 50 | 735 | 17 |
| 22 Comparative Example | 1 | 0.210 | 1.0 | 769 | 1.4 | 50 | 735 | 55 |
| 23 Invention | 2 | 0.190 | 1.0 | 769 | 1.4 | 50 | 650 | 25 |
| 24 Invention | 2 | 0.190 | 1.0 | 769 | 1.4 | 50 | 600 | 25 |
| 25 Comparative Example | 2 | 0.190 | 1.0 | 769 | 1.4 | 50 | 735 | 25 |
| 26 Comparative Example | 2 | 0.190 | 1.0 | 769 | 1.4 | 50 | 735 | 17 |
| 27 Comparative Example | 2 | 0.190 | 1.0 | 769 | 1.4 | 50 | 735 | 55 |
| 28 Invention | 4 | 0.185 | 1.0 | 769 | 1.4 | 50 | 650 | 25 |

TABLE 2-continued

| Example | Steel [Tab. 1] | D [mm] | NWG [%] | Tm [° C.] | tH [s] | dT/dt_K1 [K/s] | Tq [° C.] | Tf [° C.] |
|---|---|---|---|---|---|---|---|---|
| 20 Invention | 4 | 0.185 | 1.0 | 769 | 1.4 | 50 | 600 | 25 |
| 30 Comparative Example | 4 | 0.185 | 1.0 | 769 | 1.4 | 50 | 735 | 25 |
| 31 Comparative Example | 4 | 0.185 | 1.0 | 769 | 1.4 | 50 | 735 | 17 |
| 32 Comparative Example | 4 | 0.185 | 1.0 | 769 | 1.4 | 50 | 735 | 55 |
| 33 Invention | 5 | 0.200 | 1.0 | 769 | 1.4 | 50 | 650 | 25 |
| 34 Invention | 5 | 0.200 | 1.0 | 769 | 1.4 | 50 | 600 | 25 |
| 35 Comparative Example | 5 | 0.200 | 1.0 | 769 | 1.4 | 50 | 735 | 25 |
| 38 Comparative Example | 5 | 0.200 | 1.0 | 769 | 1.4 | 50 | 735 | 17 |
| 39 Comparative Example | 5 | 0.200 | 1.0 | 769 | 1.4 | 50 | 735 | 55 |

TABLE 3

| | | in rolling direction | | | | | structure | |
|---|---|---|---|---|---|---|---|---|
| Example | Steel [Tab. 1] | Rp0.2 [MPa] | ReL [MPa] | ReH [MPa] | A [%] | Rm [MPa] | martensite [Yes/No] | Flatness [I-Unit] |
| 1 Comparative Example | 6 | 588 | 571 | 621 | 14 | 587 | Yes | 1.5 |
| 2 Invention | 6 | 564 | 545 | 592 | 16 | 552 | No | 1.3 |
| 3 Invention | 6 | 498 | 486 | 516 | 15 | 497 | No | 1.2 |
| 4 Invention | 6 | 479 | 473 | 487 | 17 | 489 | No | 1.4 |
| 5 Invention | 6 | 473 | 445 | 480 | 18 | 476 | No | 0.9 |
| 6 Comparative Example | 6 | 599 | 581 | 630 | 13 | 597 | Yes | 20.2 |
| 7 Comparative Example | 6 | 605 | 586 | 637 | 14 | 598 | Yes | 36.1 |
| 8 Comparative Example | 6 | 598 | 578 | 631 | 13 | 598 | Yes | 12.0 |
| 9 Comparative Example | 6 | 591 | 572 | 622 | 13 | 597 | Yes | 36.5 |
| 10 Comparative Example | 6 | 490 | 475 | 502 | 16 | 473 | Yes | 43.5 |
| 11 Invention | 6 | 561 | 549 | 590 | 15 | 554 | No | 1.2 |
| 12 Comparative Example | 6 | 558 | 542 | 583 | 16 | 550 | No | 17.3 |
| 13 Invention | 3 | 430 | 436 | 421 | 16 | 424 | No | 1.7 |
| 14 Invention | 3 | 402 | 397 | 406 | 16 | 405 | No | 1.8 |
| 15 Comparative Example | 3 | 513 | 493 | 526 | 14 | 498 | Yes | 19.6 |
| 16 Comparative Example | 3 | 521 | 501 | 533 | 16 | 506 | Yes | 10.3 |
| 17 Comparative Example | 3 | 408 | 393 | 419 | 18 | 389 | Yes | 40.1 |
| 18 Invention | 1 | 363 | 366 | 366 | 16 | 359 | No | 1.2 |
| 19 Invention | 1 | 319 | 325 | 336 | 16 | 326 | No | 1.4 |
| 20 Comparative Example | 1 | 428 | 408 | 438 | 15 | 411 | Yes | 21.7 |
| 21 Comparative Example | 1 | 432 | 412 | 444 | 16 | 417 | yes | 11.4 |
| 22 Comparative Example | 1 | 334 | 319 | 348 | 28 | 317 | yes | 42.9 |
| 23 Invention | 2 | 384 | 385 | 388 | 15 | 382 | No | 1.3 |
| 24 Invention | 2 | 336 | 346 | 358 | 16 | 346 | No | 1.5 |
| 25 Comparative Example | 2 | 457 | 423 | 458 | 14 | 460 | Yes | 20.0 |
| 26 Comparative Example | 2 | 462 | 442 | 472 | 13 | 446 | Yes | 12.1 |
| 27 Comparative Example | 2 | 347 | 332 | 358 | 24 | 329 | Yes | 42.8 |
| 28 Invention | 4 | 450 | 458 | 443 | 15 | 444 | No | 2.3 |
| 29 Invention | 4 | 419 | 418 | 429 | 14 | 424 | No | 2.2 |
| 30 Comparative Example | 4 | 559 | 539 | 568 | 13 | 542 | Yes | 18.5 |
| 31 Comparative Example | 4 | 568 | 548 | 581 | 13 | 553 | Yes | 9.7 |
| 32 Comparative Example | 4 | 429 | 414 | 437 | 20 | 410 | Yes | 39.6 |
| 33 Invention | 5 | 500 | 487 | 517 | 15 | 498 | No | 1.5 |
| 34 Invention | 5 | 480 | 474 | 488 | 17 | 490 | No | 1.8 |
| 35 Comparative Example | 5 | 599 | 581 | 633 | 13 | 597 | Yes | 17.2 |
| 36 Comparative Example | 5 | 600 | 557 | 613 | 16 | 582 | Yes | 12.5 |
| 37 Comparative Example | 5 | 486 | 466 | 498 | 18 | 481 | Yes | 45.1 |

The invention claimed is:

1. A cold rolled flat steel product for packaging with a thickness of less than 0.49 mm and the following composition in terms of weight:
C: 0.01-0.1%,
Si: <0.03%,
Mn: <0.6%,
P: <0.1%,
S: <0.03%,
Al: <0.1%,
N: <0.02%,
optional Cr: <0.1%,
optional Ni: <0.1%,
optional Cu: <0.1%,
optional Ti: <0.01%,
optional B: <0.005%,
optional Nb: <0.01%,
optional Mo: <0.02%,
optional Sn: <0.03%, and
residual iron and unavoidable impurities,
wherein the flat steel product has a martensite-free microstructure and a flatness of 5 I-units or less.

2. The flat steel product according to claim 1, wherein in an aged state the flat steel product has a yield strength of from 300 MPa to 700 MPa, wherein the aged state of the flat steel product being obtained either naturally by storage at room temperature and/or by painting with subsequent drying or artificially by heating the flat steel product for 20 minutes to temperatures in a range from 200° C. to 210° C.

3. The flat steel product according to claim 1, wherein in an aged state the flat steel product has an elongation at break of 10% or more, wherein the aged state of the flat steel product being obtained either naturally by storage at room temperature and/or by painting with subsequent drying or artificially by heating the flat steel product for 20 minutes to temperatures in a range from 200° C. to 210° C.

4. The flat steel product according to claim 1, wherein the steel microstructure of the flat steel product contains neither martensite nor bainite and no austenite.

5. The flat steel product according to claim 4, wherein the steel microstructure of the flat steel product contains only ferrite or contains ferrite and one or more of microstructural constituents cementite and pearlite.

6. The flat steel product according to claim 1, wherein the flat steel product has been skin-passed with a skin-passing degree of not more than 5% and has a yield strength of 300 MPa to 500 MPa or wherein the flat steel product has been rerolled with a re-rolling degree of more than 5% and up to 45% and has a yield strength of 430 MPa to 700 MPa.

7. The flat steel product according to claim 1, wherein the flat steel product has an edge corrugation with a maximum corrugation height of 1.5 mm and/or over a length of the flat steel product in a rolling direction of 1 meter has fewer than six corrugations with a corrugation height of more than 1.0 mm.

8. The flat steel product according to claim 1, wherein the flat steel product is obtained from a steel having the composition of the flat steel product by:
  hot rolling a slab produced from the a steel to obtain a hot-rolled steel strip,
  cold rolling the hot-rolled steel strip at a reduction ratio of at least 80% to obtain a cold-rolled steel strip with a thickness of less than 0.49 mm,
  annealing the cold-rolled steel strip in a continuous annealing furnace, wherein for obtaining a recrystallization-annealed steel strip the cold-rolled steel strip is inductively heated in the continuous annealing furnace to an annealing temperature above a recrystallization temperature and held at the annealing temperature for a predetermined holding time,
  primary cooling of the recrystallization-annealed steel strip to a take-off temperature which is below a transformation temperature of 723° C. with a maximum primary cooling rate of less than 1000 K/s, and
  secondary cooling of the recrystallization-annealed steel strip to a temperature of less than 80° C. with a secondary cooling rate of more than 1000 K/s.

9. The flat steel product according to claim 8, wherein the primary cooling is effected by gas cooling and the secondary cooling is effected by water cooling.

10. The flat steel product according to claim 8, wherein the recrystallization-annealed steel strip is skin-passed after cooling with a skin-passing degree between 0.2% to 5%, wherein a yield strength of the skin-passed steel strip is between 300 and 500 MPa.

11. The flat steel product according to claim 8, wherein the recrystallization-annealed steel strip is skin-passed after cooling with a skin-passing degree between 0.2% to 5% and after skin-passing has a yield strength of 300 MPa and 500 MPa or wherein the recrystallization-annealed steel strip is cold re-rolled after cooling with a re-rolling degree of more than 5% and up to 45% and after re-rolling has a yield strength of between 430 MPa and 700 MPa.

12. The flat steel product according to claim 8, wherein the cold-rolled steel strip is inductively heated to the annealing temperature during annealing in the continuous annealing furnace at a heating rate of more than 100 K/s.

13. The flat steel product according to claim 8, wherein the cold-rolled steel strip is maintained at the annealing temperature during annealing in the continuous annealing furnace for a holding time of less than 1 second.

14. The flat steel product according to claim 8, wherein the annealing temperature is between 725° C. and 769° C.

15. The flat steel product according to claim 8, wherein the cold-rolled steel strip is cooled from the annealing temperature to the take-off temperature ($T_q$) at a primary cooling rate of at least 25 K/s during primary cooling.

16. The flat steel product according to claim 8, wherein a surface of the flat steel product immediately after secondary cooling, has a surface oxidation with a maximum oxide coverage of 300 $C/m^2$.

17. The flat steel product according to claim 8, wherein the take-off temperature is at a maximum of 600° C.

18. The flat steel product according to claim 8, wherein, after secondary cooling, a coating is applied on at least one surface of the flat steel product, wherein the coating is at least one of a tin coating, a chromium/chromium oxide coating, and an organic coating.

19. A flat steel product for packaging with a thickness of less than 0.49 mm and the following composition in terms of weight:
  C: 0.01-0.1%,
  Si: <0.03%,
  Mn: <0.6%,
  P: <0.1%,
  S: <0.03%,
  Al: <0.1%,
  N: <0.02%, and
  residual iron and unavoidable impurities,
  wherein the flat steel product has a martensite-free microstructure and a flatness of 5 I-units or less.

20. The flat steel product according to claim 19, further comprising one or more of, in terms of weight:
  Cr: <0.1%,
  Ni: <0.1%,
  Cu: <0.1%,
  Ti: <0.01%,
  B: <0.005%,
  Nb: <0.01%,
  Mo: <0.02%, and
  Sn: <0.03%.

* * * * *